United States Patent
Haubenstricker et al.

(10) Patent No.: US 12,459,567 B2
(45) Date of Patent: Nov. 4, 2025

(54) STEERING LINKAGE ASSEMBLY, SEAL INTEGRITY DIAGNOSTIC SYSTEM AND TEST METHOD

(71) Applicant: Steering Solutions IP Holding Corporation, Saginaw, MI (US)

(72) Inventors: Kevin J. Haubenstricker, Frankenmuth, MI (US); Kevin M. McClendon, Frankenmuth, MI (US); Katie Young, Beaverton, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 18/582,179

(22) Filed: Feb. 20, 2024

(65) Prior Publication Data

US 2025/0263121 A1    Aug. 21, 2025

(51) Int. Cl.
*B62D 7/16*   (2006.01)
*B60W 10/20*  (2006.01)
*B62D 5/04*   (2006.01)
*B62D 7/04*   (2006.01)
*B62D 15/02*  (2006.01)

(52) U.S. Cl.
CPC .............. *B62D 7/16* (2013.01); *B60W 10/20* (2013.01); *B62D 5/0403* (2013.01); *B62D 7/04* (2013.01); *B62D 15/029* (2013.01); *B60W 2422/50* (2013.01); *B60W 2510/20* (2013.01)

(58) Field of Classification Search
CPC ...... B62D 5/0403; B62D 15/029; B62D 7/16; B62D 7/04; B60W 2422/50; B60W 2510/20; B60W 10/20
See application file for complete search history.

(56) References Cited

U.S. PATENT DOCUMENTS

| 10,578,213 | B2 * | 3/2020 | Larson | B62D 3/12 |
| 2016/0208918 | A1 * | 7/2016 | Dunning | F16D 3/845 |
| 2022/0402543 | A1 * | 12/2022 | Haubenstricker | G01M 3/26 |

FOREIGN PATENT DOCUMENTS

JP   2022128844 A  *  9/2022

OTHER PUBLICATIONS

JP2022128844A Machine English Translation (Year: 2022).*

* cited by examiner

*Primary Examiner* — Jason D Shanske
*Assistant Examiner* — Matthew James O'Neill
(74) *Attorney, Agent, or Firm* — Dickinson Wright PLLC

(57) ABSTRACT

A steering linkage assembly includes a steering linkage that is operatively connectable to a pair of road wheels. The steering linkage assembly also includes a housing defining a sealed compartment containing at least a portion of the steering linkage. The steering linkage assembly further includes a first sealing boot operatively coupled to the steering linkage and located proximate a first end of the housing. The steering linkage assembly yet further includes a second sealing boot operatively coupled to the steering linkage and located proximate a second end of the housing, wherein the first sealing boot has at least one distinctive characteristic relative to the second sealing boot to define non-identical sealing boots.

13 Claims, 4 Drawing Sheets

STEERING LINKAGE ASSEMBLY, SEAL INTEGRITY DIAGNOSTIC SYSTEM AND TEST METHOD

FIELD OF THE INVENTION

This disclosure relates to a steering systems and, more particularly, to a steering linkage assembly, as well as a seal integrity diagnostic system and test method.

BACKGROUND

A vehicle, such as a car, truck, sport utility vehicle, crossover, mini-van, marine craft, aircraft, all-terrain vehicle, recreational vehicle, or other suitable vehicles, include various steering system schemes, for example, steer-by-wire (SbW) and driver interface steering. Often, the various steering schemes include an electric power steering (EPS) system including components such as a steering wheel, a column structure, a rack-pinion gear, an electric motor actuator, etc. The EPS helps the operator steer a vehicle by providing necessary assist torque and feedback.

Under-hood EPS applications are required to be sealed from the under-hood environment to ensure the integrity of the mechanical and electrical components within the unit. Standard processes to ensure that the unit is sealed from water intrusion involves leak testing the EPS unit on a steering assembly line. Once proven to be sealed, testing in the field is not routinely performed.

This method of the leak testing on the steering assembly line is typically sufficient to ensure the gear integrity as it leaves the leak test stand on the steering assembly line, but does nothing to ensure steering gear sealing integrity as the gear travels down the assembly line, to the vehicle assembly plant, as it is installed in the vehicle, or again during the life of the vehicle.

Accordingly, it would be well received in the industry to be able to verify the integrity of the EPS gear seals when it is in the field in order to mitigate any risk of failure modes, such as the potential loss of assist events due to water intrusion, prior to their occurrence.

SUMMARY

According to one aspect of the disclosure, a steering linkage assembly includes a steering linkage that is operatively connectable to a pair of road wheels. The steering linkage assembly also includes a housing defining a sealed compartment containing at least a portion of the steering linkage. The steering linkage assembly further includes a first sealing boot operatively coupled to the steering linkage and located proximate a first end of the housing. The steering linkage assembly yet further includes a second sealing boot operatively coupled to the steering linkage and located proximate a second end of the housing, wherein the first sealing boot has at least one distinctive characteristic relative to the second sealing boot to define non-identical sealing boots.

According to another aspect of the disclosure, a method to diagnose sealing integrity of a steering linkage assembly is provided. The method includes monitoring a pressure within a sealed compartment defined by a first sealing boot, a second sealing boot and a rack housing assembly, wherein the first sealing boot has at least one distinctive characteristic relative to the second sealing boot to define non-identical sealing boots. The method also includes moving a steering linkage at least partially disposed within the sealed compartment. The method further includes detecting a pressure change of the sealed compartment during movement of the steering linkage. The method yet further includes comparing the pressure change within the sealed compartment with a threshold pressure change to determine if the sealed compartment has a leak present.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

The following discussion is directed to various embodiments of the disclosure. The embodiments disclosed herein should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

The present invention described herein may be incorporated into any suitable vehicle, such as a car, a truck, a sport utility vehicle, a mini-van, a crossover, any other passenger vehicle, any suitable commercial vehicle, or any other suitable vehicle. Moreover, principles of the present disclosure may apply to other vehicles, such as planes, boats, trains, drones, or other suitable vehicles. Moreover, the present invention may be incorporated into various steering system schemes and electric power steering (EPS) systems, including steer-by-wire systems.

As will be appreciated from the disclosure, a system and method is provided to detect failures of certain components due to fluid intrusion, such as water intrusion. In particular, the system and test method provides the ability to verify a steering gear sealing condition throughout the life of the vehicle. Although sealing protection of a steering gear is discussed in detail herein, it is to be appreciated that other components of a steering system may be monitored for sealing conditions with the embodiments disclosed herein.

Figure 1:
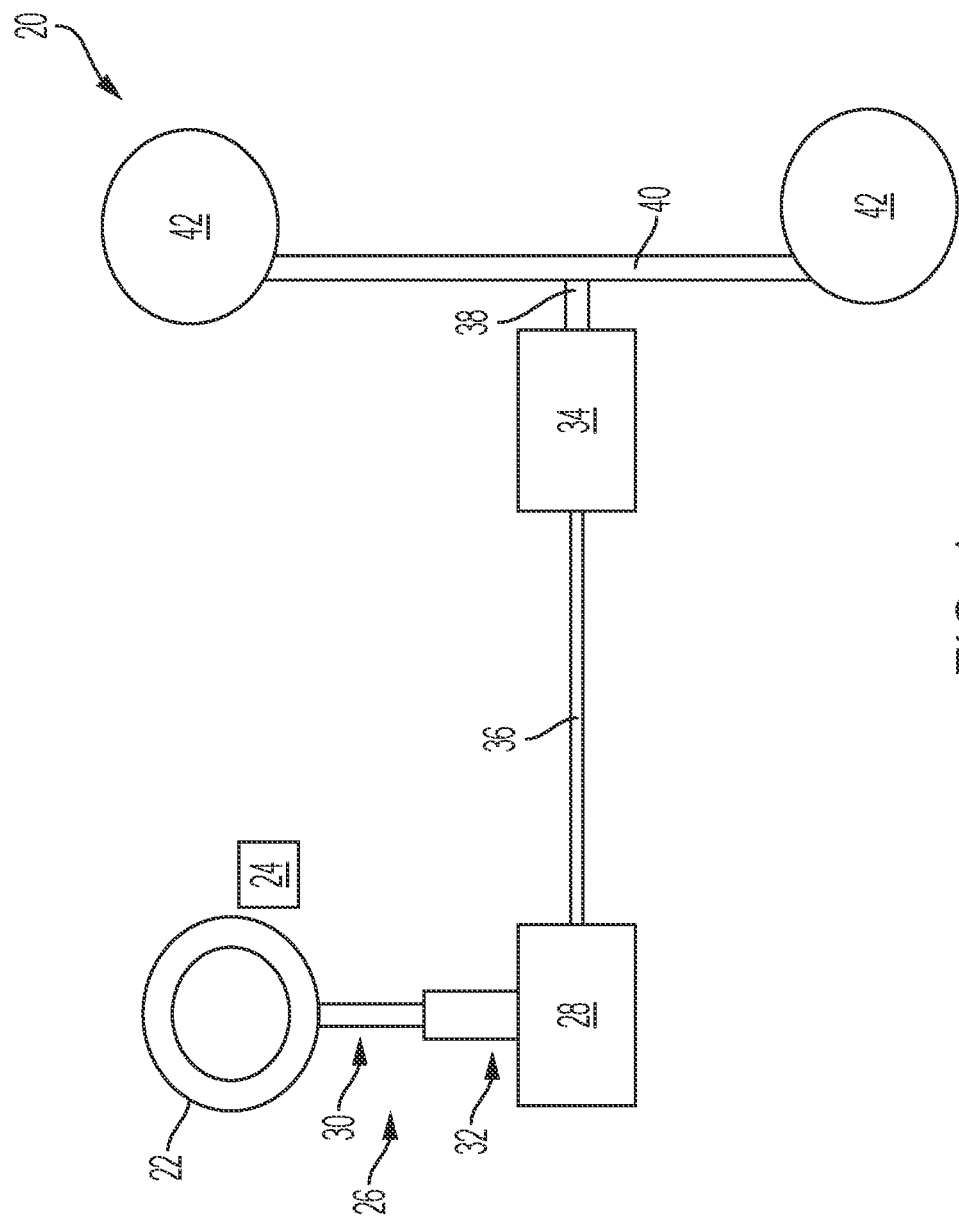
FIG. 1 schematically illustrates a steering system having a steering gear.

Referring initially to FIG. 1, a power steering system 20 is generally illustrated. The power steering system 20 may be configured as a driver interface steering system, an autonomous driving system, or a system that allows for both driver interface and autonomous or semi-autonomous steering. The steering system may include an input device 22, such as a steering wheel or other HWAs, wherein a driver may mechanically provide a steering input by turning the steering wheel. An airbag device 24 may be located on or near the input device 22. A steering column 26 extends along an axis from the input device 22 to an output assembly 28. The steering column 26 may include at least two axially adjustable parts, for example, a first portion 30 and a second portion 32 that are axially adjustable with respect to one another. The output assembly 28 may include a pinion shaft assembly, an I-shaft, a cardan joint, steer-by-wire components or any other features conventionally located opposite the input device 22. In other words, the steering column 26 may include a mechanical connection to the steering linkage (also referred to as a rack) or may be a steer-by-wire system that does not require a continuous mechanical connection. The output assembly 28 may connect to a power-assist assembly 34 via a connection 36. The connection 36 may be one of a steering gear input shaft, a continuation of the pinion shaft assembly, or wired or wireless digital communication protocols.

The power-assist assembly 34 may operably connect to a steering linkage 40 via a steering gear assembly 38. In operation, actuation of the driver input 22 causes a responsive movement of the power-assist assembly 34 and causes the steering linkage 40 to steer an associated vehicle via road wheels 42, to which the steering linkage is operatively connected to. The power-assist assembly 34 may be part of a single pinion electronically assisted power steering (SPEPS) system, a dual pinion electronically assisted power steering (DPEPS) system, a column electrical power steering (CEPS) system, or a recirculation ball-type rack electrical power steering (REPS) system.

Figure 2:
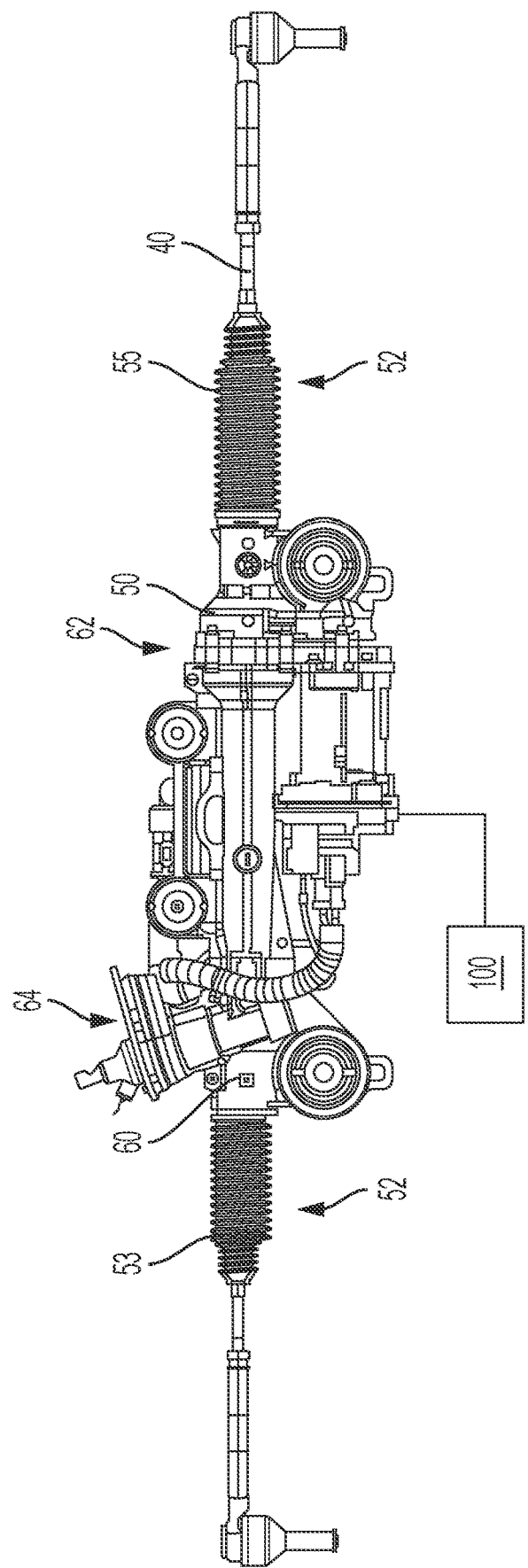
FIG. 2 is a perspective view of a steering rack assembly.

Referring now to FIG. 2, a portion of the steering column 26 passes under the hood of the vehicle, such that it is proximate the engine and fluid containing components. The disclosed system and testing method utilize a pressure sensor to sense the internal pressure of a sealed compartment that the steering linkage 40 is located within. In particular, a rack housing assembly 50 and a pair of seal boots 52 contain and seal the steering linkage 40 therein. More or fewer sealing components may be present in some embodiments, but the overall sealed compartment may be referred to herein as simply the sealed compartment.

The system and method disclosed herein monitor the internal pressure within the sealed compartment with a pressure sensor 60. It has been observed that a volume change occurring within the seal boots 52 during translation of the steering linkage 40 during steering events is imbalanced between an expanding and contracting boot. Therefore, as the steering linkage 40 is steered to the left or right, an internal pressure change within the overall sealed compartment occurs due to the changing volume of the two boots. This pressure change may vary depending on the particular application. This pressure change is not observable if a significant leak is present in either of the boots 52 or other sealing members which define the sealed compartment. Accordingly, the system and testing method disclosed herein monitors for a given level of pressure change during a steering cycle in order to verify that a significant leak is not present.

As disclosed above, the pressure sensor 60 is positioned to monitor the pressure within the sealed compartment to determine whether a leak is present in the sealed compartment. The pressure sensor 60 may be any type of sensor suitable for monitoring the pressure ranges found within the sealed compartment and for the overall packaging constraints. The pressure sensor 60 may be positioned in numerous contemplated locations associated with the sealed compartment. For example, the pressure sensor 60 may be located within a first sealing boot 53 of the sealing boots 52 or within a second sealing boot 55 of the sealing boots 52. By way of other non-limiting example, the pressure sensor 60 may be located within the rack housing assembly 50 proximate a gear assembly 62 powered by a motor or proximate a circuit card assembly 64. Alternative locations associated with the sealed compartment are also contemplated. Regardless of the precise location of the pressure sensor 60, the pressure sensor 60 is in operative communication (wired or wireless) with a processor and controller 100 that is able to convert the signal generated by the pressure sensor 60 into data that can be analyzed to assess whether the detected internal pressure of the sealed compartment is indicative of a leak.

The controller 100 compares the detected pressure change over a range of travel to a predetermined threshold pressure change. If a detected pressure change is lower than the threshold pressure change, the condition is indicative of a leak condition of the sealed compartment. In this event, the controller 100 issues a diagnostic warning if the leak condition is detected. The warning may be in the form of an alert to a vehicle operator or may be provided with special diagnostic tools used by maintenance personnel.

In another embodiment, the system and method analyze for a leak using the same inputs, but the steering maneuver (e.g., left turn or right turn) that results in the pressure change is held in that position to monitor pressure drop, which may allow for detection of a more refined leak rate. In such an embodiment, the pressure sensor 60 is in operative communication with the controller 100 and the controller 100 issues a diagnostic warning if the pressure drop exceeds a threshold pressure drop.

The above-described volumetric—and therefore pressure change—observed during movement of the steering linkage 40, as well as the sealing boots, 53, 55 is magnified when the first sealing boot 53 and the second sealing boot 55 are non-identical. The term "non-identical", when referencing the sealing boots 53, 55, as used herein, refers to any difference in diameter, length, corrugation geometry, overall geometry, overall surface area, stiffness, and/or any other material property.

The detectable internal pressure change within the rack housing assembly 50 is generated by the sealing boots 53, 55, particularly by the non-identical structure of the boots. This is due to the volume change of the sealing boots 53, 55 generated during collapsing and expanding of the sealing boots 53, 55 during translation of the steering linkage 40.

Figure 3:
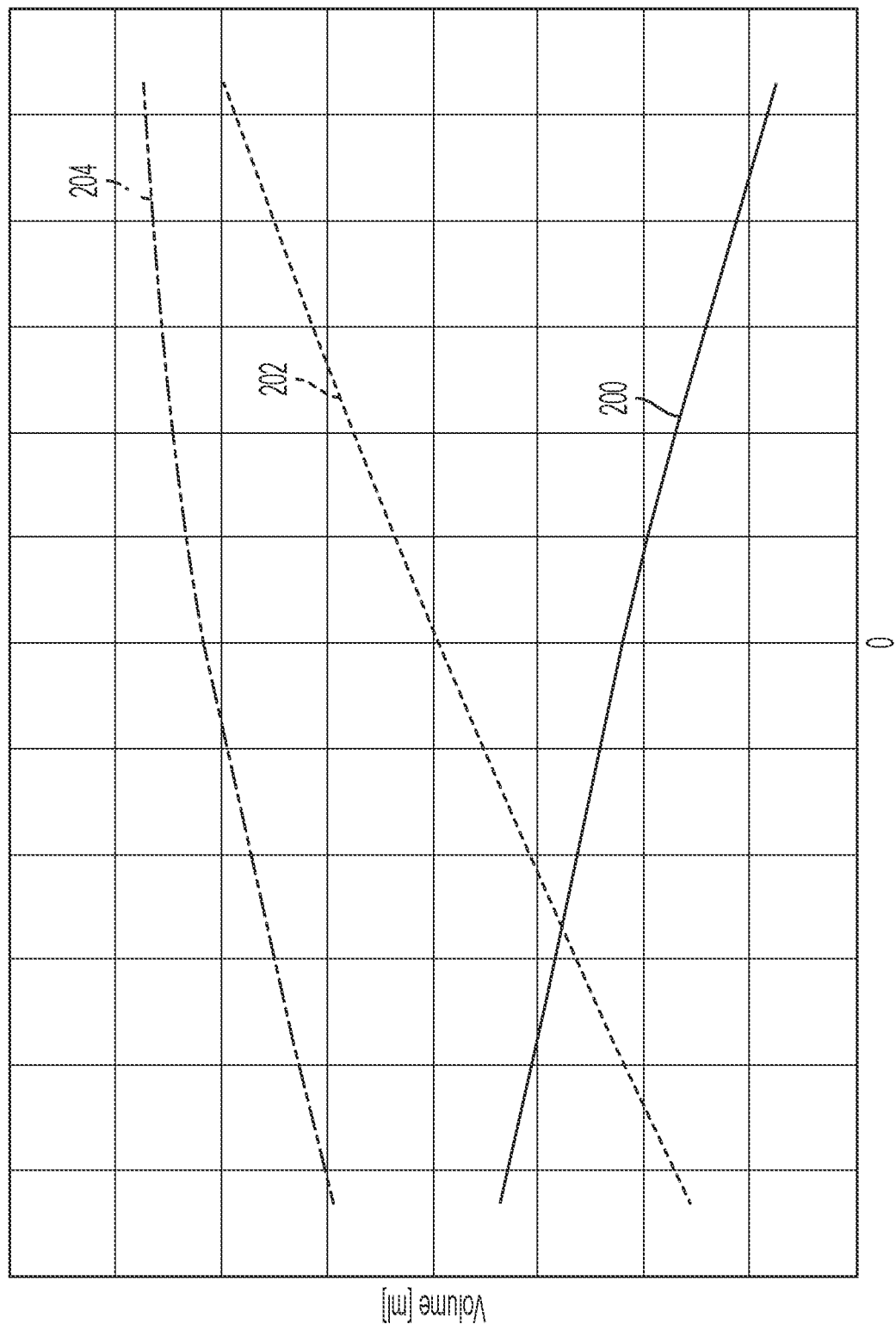
FIG. 3 is a plot of volume vs. position for a steering gear system operating under a properly sealed condition.

FIG. 3 illustrates the volume changes exhibited by each sealing boot 53, 55 under an unleaked condition (i.e., properly sealed) of the sealing boots 53, 55. In particular, FIG. 3 is a plot of sealing boot volume vs. steering linkage position when the sealing boots 53, 55 are operating under a properly sealed condition. The horizontal axis represents travel positions of a point on the steering linkage 40. The steering linkage 40 is moved away from an "on center" position (referenced with 0 on horizontal axis) toward a right or left hand turn position.

The plot line referenced with numeral 200 represents the volume of the first sealing boot 53, the plot line referenced with numeral 202 represents the volume of the second sealing boot 55, and the plot line referenced with numeral 204 represents the summation of the volumes of the first sealing boot 53 and the second sealing boot 55. These plot lines evidence volume changes of the first sealing boot 53, the second sealing boot 55 and the combined volume change over the full range of travel of the steering linkage 40.

Figure 4:
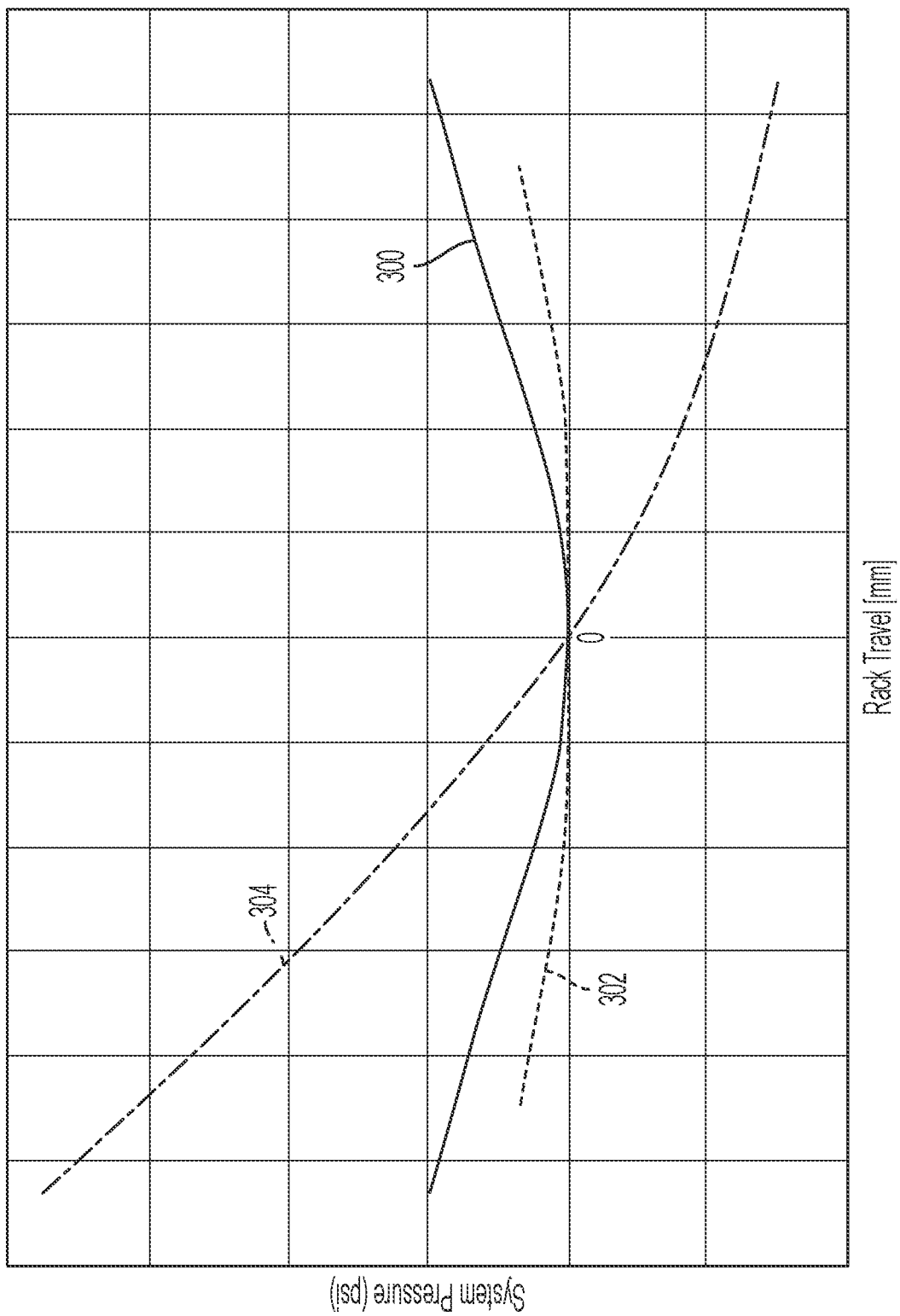
FIG. 4 is a plot of pressure vs. position for the steering gear system operating under a properly sealed condition.

FIG. 4 illustrates the pressure changes exhibited within the rack housing assembly 50 under an unleaked condition (i.e., properly sealed) of the sealing boots 53, 55—and the housing overall. In particular, FIG. 4 is a plot of pressure within the rack housing assembly vs. steering linkage position when the sealing boots 53, 55 are operating under a properly sealed condition. The horizontal axis represents travel positions of a point on the steering linkage 40. The steering linkage 40 is moved away from an "on center" position (referenced with 0 on horizontal axis) toward a right or left hand turn position.

The plot line referenced with numeral 300 represents the predicted overall system pressure (i.e., pressure within the rack housing assembly 50) of an assembly utilizing two substantially identical sealing boots, as done in the prior art. The plot line referenced with numeral 302 represents data obtained during testing of an assembly utilizing two substantially identical sealing boots. As shown, while the magnitudes of plots 300 and 302 are offset, the behavior of the system pressure plots are generally similar and symmetric about the "on center" position.

The plot line referenced with numeral 304 represents the predicted overall system pressure of the embodiments disclosed herein, which includes two non-identical sealing boots (e.g., sealing boots 53, 55). The general shape and characteristics of pressure plot line 304 is starkly different than the generally symmetric shape of plot lines 300, 302. This distinctive pressure profile over the range of steering linkage 40 travel provides more certainty with diagnostic results related to sealing integrity of the sealing boots 53, 55 and overall rack housing assembly 50. In contrast, no significant pressure change is observed over a full steering travel range in situations where a leak is present.

The embodiments described herein may be used with a single pressure sensor in some embodiments. However, it is to be understood that more than one may be utilized for redundancy purposes. Nevertheless, the pressure sensor and monitoring during typical usage of the vehicle is less complex than prior leak diagnosing efforts that require several components and specific test routines.

Although FIG. 2 illustrates monitoring pressure of a sealed compartment with a pair of sealing boots, it is to be appreciated that pressure monitoring of a single sealing boot may be performed in some systems. Such an embodiment may be referred to as a "single wheel actuator system." In such a system, the monitored pressure change disclosed herein within the sealed compartment would fluctuate as the single boot is translated. It is to be understood that single boot embodiments are within the scope of the disclosed embodiments, as are overall sealed compartments with more sealing boots or other components.

While the invention has been described in detail in connection with only a limited number of embodiments, it is to be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Moreover, any feature, element, component or advantage of any one embodiment can be used on any of the other embodiments. Accordingly, the invention is not to be seen as limited by the foregoing description

What is claimed is:

1. A steering linkage assembly comprising:
    a steering linkage that is operatively connectable to a pair of road wheels;
    a housing defining a sealed compartment containing at least a portion of the steering linkage;
    a first sealing boot operatively coupled to the steering linkage and located proximate a first end of the housing;
    a second sealing boot operatively coupled to the steering linkage and located proximate a second end of the housing, wherein the first sealing boot has at least one distinctive characteristic relative to the second sealing boot to define non-identical sealing boots; and
    a pressure sensor positioned to detect an internal pressure within the sealed compartment over a range of travel of the steering linkage, wherein a pressure change lower than a pressure change threshold indicates a leak condition of the sealed compartment, wherein the internal pressure over a range of travel of the steering linkage is not symmetric about a center position based on the at least one distinctive characteristic of the first sealing boot relative to the second sealing boot.

2. The steering linkage assembly of claim 1, wherein the pressure sensor is at least partially disposed within the first boot.

3. The steering linkage assembly of claim 1, wherein the pressure sensor is at least partially disposed within the second boot.

4. The steering linkage assembly of claim 1, wherein the pressure sensor is at least partially disposed within the housing.

5. The steering linkage assembly of claim 1, further comprising an additional pressure sensor positioned to detect an internal pressure within the sealed compartment over a range of travel of the steering linkage.

6. The steering linkage assembly of claim 5, wherein the pressure sensor and the additional pressure sensor are in operative communication with a controller.

7. The steering seal diagnostic system of claim 1, wherein the pressure sensor is in operative communication with a controller.

8. The steering linkage assembly of claim 7, wherein the controller issues a diagnostic warning if the leak condition is detected.

9. The steering linkage assembly of claim 1, wherein the at least one distinctive characteristic is a sealing boot length.

10. The steering linkage assembly of claim 1, wherein the at least one distinctive characteristic is a sealing boot diameter.

11. The steering linkage assembly of claim 1, wherein the at least one distinctive characteristic is a sealing boot corrugation geometry, overall geometry, overall surface area, stiffness, and/or any other material property.

12. The steering linkage assembly of claim 1, wherein the at least one distinctive characteristic is a sealing boot material property.

13. The steering linkage assembly of claim 12, wherein the at least one distinctive characteristic is a sealing boot stiffness.

* * * * *